United States Patent Office 3,478,494
Patented Nov. 18, 1969

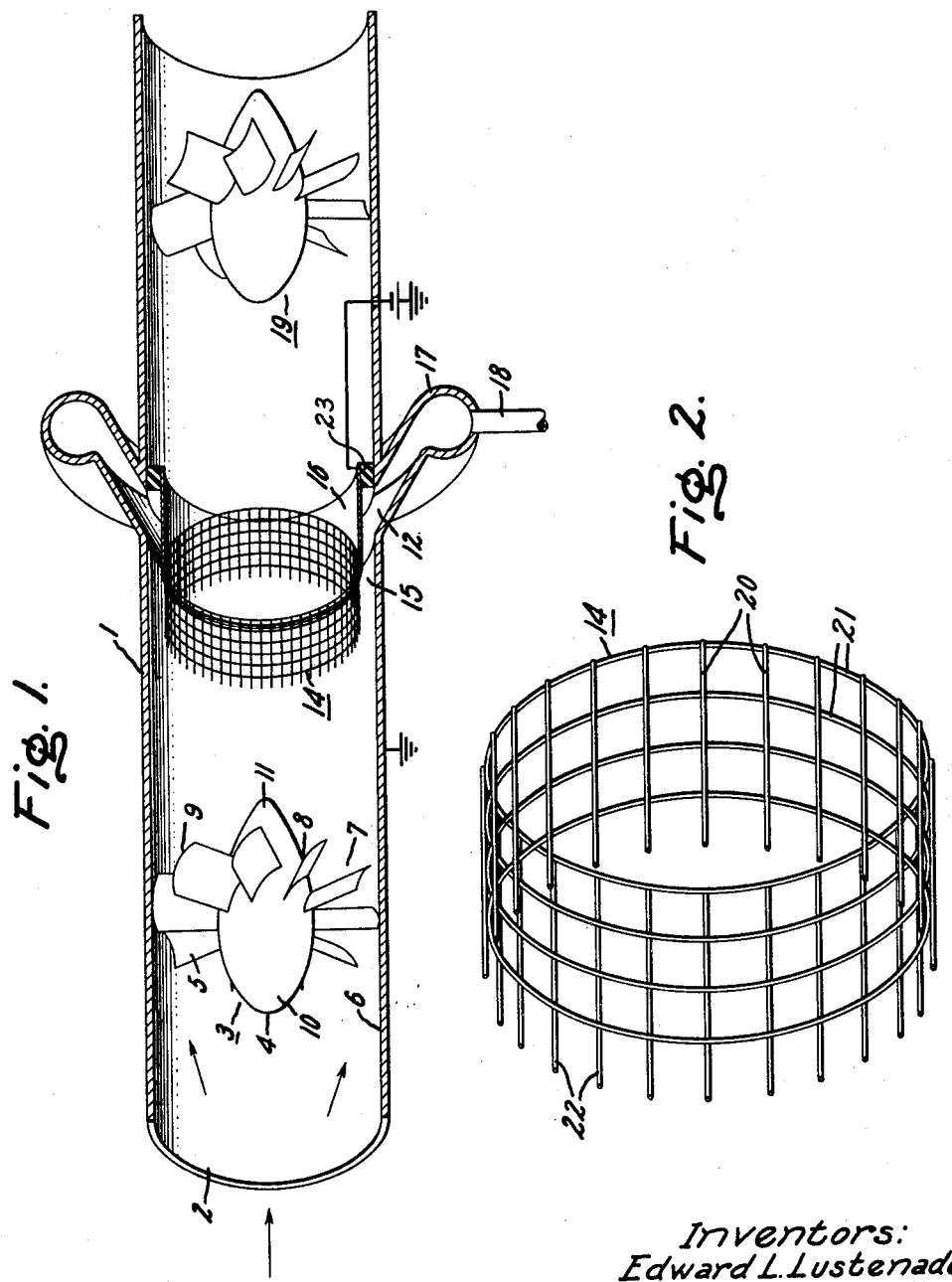

3,478,494
VORTEX-ELECTROSTATIC SEPARATOR
Edward L. Lustenader, Scotia, and Frank W. Van Luik, Jr., Schenectady, N.Y., assignors to General Electric Company, a corporation of New York
Continuation-in-part of application Ser. No. 546,672, May 2, 1966. This application June 26, 1968, Ser. No. 740,320
Int. Cl. B03c 3/14
U.S. Cl. 55—127                              1 Claim

ABSTRACT OF THE DISCLOSURE

Apparatus for the separation of both small and large particles from a flow stream by a combination of vortex and electric fields. A strong vortex field is provided in a tube for swirling particles to the wall of the tube. The large particles reach the wall after a short distance of axial travel and are collected in an annular slot. The small or fine particles approach and reach the wall after a long distance of axial travel. A tubular screen coaxial with the tube is closely spaced to the wall of the tube in advance of the slot and is negatively charged to create a field and to impart a negative charge to the small particles coming within the field created by the charged screen and thereby facilitate their removal in the annular slot.

---

This application is a continuation-in-part of our co-pending application Ser. No. 546,672 now abandoned, filed May 2, 1966 and assigned to assignee of the present invention.

Our invention relates to a device for separating particles from a flow stream, and particularly to a combination vortex and electrostatic separator for separating large and small particles from a flow stream.

Vortex separators readily separate heavy particles from a gas in a flow stream as sufficient centrifugal force is caused to act on the particles by the swirl produced in the separator to assure that such particles reach the wall of the separator to which they tend to cling and where they are collected by such means as an annular slot, for example. While light or small particles can be swirled to reach the wall of the separator, they bounce off the wall more easily than heavy particles and are buffeted by other forces such as caused by Brownian motion and consequently escape collection.

It is an object of our invention to separate particles from a flow stream by combination of vortex and electrostatic actions.

It is another object of our invention to efficiently separate light particles by a combination of vortex and electrostatic separation means.

It is a further object of our invention to provide a compact vortex-electrostatic separator which is efficient and effective in the removal of particles of small size or mass as well as large size or mass from a flow stream without affecting the flow rate in the separator or introducing significant pressure drop therein.

In brief, our device is an electrostatic-vortex separator wherein particles in a flow stream are whirled toward the wall of a tube by a swirler which imparts swirling motion to the flow stream. The large particles tumble along the wall and pass out of the tube through slots therein to a collector. The small particles are thrown to the tube wall in a longer trajectory and tumble along the tube wall. As the particles pass in the electric field produced by a tubular grid charged with respect to the tube they become charged by corona discharge from the grid. Such charged particles are attracted by the tube wall and are repelled by the grid. All the particles are directed into the slot and collector by a small portion of the flow stream which is diverted from the main flow stream in the tube for that purpose.

The novel features which are believed to be characteristic of the invention are set forth in the appended claims. However, the invention itself taken together with further objects and advantages of our invention may best be understood by reference to the description taken with the accompanying drawing in which:

FIGURE 1 shows a cross-sectional view of our vortex electrostatic separator.

FIGURE 2 shows a perspective view of an embodiment of a tubular grid for the separator of FIGURE 1.

The embodiment of FIGURE 1 shows a hollow tube 1 of indeterminate length with a uniform inside diameter. At the inlet 2 of the tube is a swirl vane 3 which has a shaped central hub 4 with blades 5 projecting from the side of the central hub at the mid-point. These blades impart a tangential component of velocity to a flow stream entering the tube and passing from the entrance to the exit of the tube.

Blades 5 project radially from central hub 4 and terminate at the inside surface 6 of the tube, to which they are secured. The method of securing may be by any known method such as by welding, brazing, riveting, or by the use of nuts and bolts. The method of fastening must be sufficient to withstand the velocity and pressure of the flow that is emanating from the source of mixed flow and entering the inlet at 2. The securing must also be sufficient to withstand the possibility that the tube 1 will be a more restricted passage than the inlet source from which the air or gas is coming. Also, the restricted passage 7 which is caused by the reduced area due to the hub 4, effects an increase in velocity in that section. At the root 8 of the blades, the point of attachment to the hub, the blades have a turning angle which is greater than that at their tips 9, the point of attachment to the inside wall 6 of the tube. These blades which are arc shaped in cross-sectional area also decrease rapidly in solidity from their roots to their tips. Blades 5 may be relatively thin in cross section as shown in FIGURE 1 or aerodynamic in cross section. The curvature of all the blades is the same and they may, as shown, be in the counterclockwise direction, if the apex of the curve of the cross-sectional area of the blade is considered, as the leading part of the blade. The illustration of a specific number of blades in FIGURE 1 is not to be taken in a limiting sense.

Central hub 4 from which the vanes project, being aerodynamically shaped in a substantially elliptical configuration, presents a forward portion 10 which is gradually curved so as to avoid any sharp projections in the flow stream. This lack of any radical change in shape presents the most favorable conditions to the entering flow stream, thus avoiding any sharp edges which would cause eddies and whirls and dissipate the entrance conditions of velocity in nonadvantageous ways. Frontal shape 10 of hub 4 also serves to accelerate the flow as it enters the blade area by causing the flow to be forced through the more restricted area 7 surrounding the hub. Distal portion 11 of hub 4 in relation to the direction of the flow stream, tapers gradually in a substantially linear manner to almost a point, the end of which is rounded off. Thus, as the flow leaves the blades it encounters almost no resistance from the hub. The rearward part 11 of the hub also serves to gradually decelerate the axial component of the inlet flow so that the flow has both axial and tangential components.

Posterior to the inlet swirl vanes in the stream of flow is an extraction port 12 for bleeding off the extract from the flow stream. Port 12 comprising a circumferential slot cut into the main tube 1 and extending completely therethrough permits a high percentage of extraction with only a narrow opening. Since opening 12 extends completely around the periphery of the tube and is in a plane perpendicular to the axis of the tube, it is always at the same distance from tube inlet 2 and swirl vane 3 associated therewith. Accordingly, to remove a particular size or type of particle or a particular phase of a mixture, its trajectory can be predetermined so that it arrives at the wall before reaching the slot 12.

In the present embodiment the heavy particles are whirled to the wall of the tube and pass along the wall of the tube into slot 12 in a manner similar to that described in application Ser. No. 546,672 now abandoned, to Edward L. Lustenader et al., filed May 2, 1966 and assigned to the assignee of the present invention.

As pointed out above the mechanical swirler and slot separates particles of fairly large size or mass from the flow stream. Small particles, however, tend to remain in the flow stream, passing by the slot and continuing further down the tube 1. Particles of size of about 5 microns or less, for example, are less affected by centrifugal force than high mass particles. Such low mass particles reach the tube wall in a relatively long trajectory. Once on the tube wall they are swept and bounced along and do not fall into an extraction slot as readily as larger particles. In order to bring about separation of such particles from the flow stream, an electrostatic separator is provided and comprises tubular grid 14 connected to a high voltage source and supported a short distance inside the inner tube wall. Grid 14 is composed of wire insulated by annular insulator 23 from tube 1 and maintained at a D.C. potential preferably negative with respect to the tube 1, at least the inner wall of which is conductive between extraction port 12 and the swirling vane 3. The potential difference between the grid 14 is of a value which ionizes the gas molecules about it. The small particles passing along the tube wall are charged negatively by corona discharge from the grid 14 and are attracted to and pass along the tube wall and repelled by the grid 14. All particles then pass into annular section 15 formed by the tube wall 1 and the cylindrical flange 16 and screen 14, a small amount of the flow stream being diverted through the annular section and carrying the particles into the annular slot 12 and collector 17. For this purpose flange 16 and grid 14 are spaced fairly close to the inner wall of the tube 1 as will be pointed out with greater particularity below. A pipe 18 or series of pipes is connected to the collector for extracting the particles which have become neutralized by contact with the slot walls and collector. The electrostatic separator works best when the velocity of flow through pipe 1 is not large.

Downstream of grid 14 and slot 12 is a set of deswirl vanes 19 which serve to eliminate swirl from the flow stream without turbulence and thereby establish substantially the inlet axial flow and pressure conditions.

The tubular screen 14 is preferably constituted of wire or wire-like conductive elements to form a mesh having substantial open space such that minimal obstruction is provided to fluid flow yet sufficient conductive material is provided to enable formation of an electric field by application of different electric potentials to the screen and the tube wall.

The surface of tubular screen is spaced preferably within 10% of the radius of the tube 1 from the inner wall of tube 1. When the screen surface is more distantly placed from the surface, the screen introduces appreciable distortion of flow and requires a higher voltage and more power to operate for any noticeable improvement in collection efficiency of the small particles. The axial spacing of the upstream end of screen 14 from the vortex producing means 3 depends on flow conditions at the inlet to the tube 2, the degree of swirl imparted to the particle and the particle sizes. The axial distance of the upstream end of the screen to the exit end of the swirl vanes is selected to optimize collection of the small particles, i.e., to produce a strong electric field in the region where the greatest concentration of small particles exist.

Such axial distance is preferably greater than the axial distance from the upstream edge of the screen 14 to the upstream end of the slot 12.

The operation of the apparatus will be better understood by considering certain known relationships among variables in tubes in which a vortex has been created in a fluid flowing in the tube and also known relationships among variables in electrostatic precipitators. In a tube in which a vortex has been created in a fluid flowing therethrough, the axial component of velocity of fluid flow is zero at the walls, increases to a maximum between the axis of the tube and the wall, drops to a value at the axis to a value intermediate between zero and maximum velocity, or even may be negative indicating reverse flow. Accordingly, to provide minimum drag and minimum over-all pressure drop on fluid flow through the tube, it would be desirable to locate the electrostatic screen as close to the wall as possible. However, the location of the screen is dictated by other considerations as well. With the screen located at about 10% of the distance from the outer wall to the axis of the tube or less, good collection is obtained without introducing significant energy loss and resultant pressure drop.

It is known that the efficiency of the collection of an electrostatic precipitator depending upon a corona discharge mechanism varies directly as the length of the electrode surface in the direction of particle motion and also directly as the voltage impressed across the electrodes between which the particles move. The efficiency of collection also varies inversely as the velocity of fluid or particle motion and inversely as the square of the distance between the electrodes between which the particles move. Accordingly, location of the tubular screen close to the wall of the tube improves the collection efficiency and requires less voltage to produce a desired voltage gradient. Such location of the screen close to the wall and presenting an aspect or projected area to the axial component of fluid motion which is minimal also introduces minimal over-all pressure drop in the fluid flow through the tube.

In a corona discharge the field established between the electrodes through which a gas stream is flowing causes removal of electrons from one of the electrodes, the negative electrode. Such electrons strike the molecules of the gas which are much more numerous than particles in the flow stream causing such molecules to emit secondary electrons. The secondary electrons attach themselves to the various particles which then come under the influence of the electric field. The negatively charged particles are attracted to the positive inner wall of the tube and repelled by the negative electrode. Preferably to provide a high potential gradient which requires less voltage, the screen structure 14 is provided with sharp points as shown in FIGURE 2.

Referring now to FIGURE 2, there is shown a tubular screen of substantially uniform diameter. Such a screen would be suitable for use as structure 14 in FIGURE 1. The screen consists of a plurality of wire-like elements 20 extending in a direction parallel to the axis of the tubular screen and a plurality of substantially circular wire elements 21 spaced uniformly along the direction of the axis of the cylinder and physically attached to the wire-like elements. At one end of the tubular screen the elements project beyond the last circular wire at that end. The tubular screen of FIGURE 2 would be attached to the cylinder 16 of FIGURE 1 in an orientation in which the extensions 22 of the wire-like elements are in the direction of the incoming flow stream, that is, they would be facing upstream. Such extensions provide sharp points in the vicinity of which strong voltage gradients are created which facilitate ionization of particles passing in the vicinity thereof. In the arrangement of FIGURE 1 and also in the arrangement of FIGURE 1 with the electrode of FIGURE 2 substituted therein, the electric field would exist between the screen electrode and the grounded tube 1. As the pod of the swirler 3 is conductively connected to inner wall 6 of the tube 1 equipotential lines would extend from the upstream end of the electrode 14 to the vane structure 3. Accordingly, the zone of influence of the electric field would be generally in the vicinity of the outer end of electrode 14 and extending forward in the direction of the pod. Such zone of influence is set to be in a location where it is most effective in imparting charge to the fine particles not removable by the centrifugal action of the separator alone.

What we claim as new and desire to secure by Letters Patent of the United States is:

1. In a device for separating particles from a fluid flow stream, the combination of
 a tube having a substantially uniform diameter throughout its length for receiving a flow stream at an inlet end and discharging said flow stream at an outlet end,
 a non-revolvable means comprising a body portion extending axially of the tube and a plurality of vanes connected between said body portion and the inner wall of said tube for imparting a vortex to said flow stream and swirling particles toward the inner wall of said tube,
 an annular opening in said tube located downstream of said non-revolvable means in the vortex field thereof and containing a plane substantially perpendicular to the axis of said tube for diverting fluid flow near the inner wall of said tube through said opening,
 a tubular screen formed of a wire-like conductive mesh material, open at both ends and having a substantially uniform diameter less than ten percent smaller in diameter than the diameter of said tube, said tubular screen being coaxially aligned in said tube and in an axial position between said non-revolvable means and said annular opening, the end of said tubular screen nearest said one non-revolvable means being axially spaced apart a substantial distance from the body portion of said one non-revolvable means and having wire-like extensions to provide a plurality of conductive points,
 an annular insulating member located in said tube on the downstream side of said annular opening connecting means physically connecting said screen to said insulating member to support said screen in electrically insulated relationship to said tube, the inner wall of said tube and said screen and said connecting means defining therebetween an annular passageway within said tube to said opening from the upstream end of said grid, said insulating member closing the downstream end of said annular passageway, the section of the inner wall of said tube between said opening and said non-revolvable means in the vicinity of said screen being electrically conductive,
 means establishing a difference in electrical potential between said tubular screen and said section of the inner wall of said tube of such value as to charge the particles passing in the electric field established between said screen and said tube whereby particles passing in the field produced by the application of said potential difference to said tube and tubular screen are charged and attracted toward the inner wall of said tube and repelled by said tubular screen and pass along said passageway to said opening,
 collector means connected to said opening for extracting particles flowing in said opening, and
 another non-revolvable means positioned downstream of said annular opening and comprising a body portion extending axially of said tube and a plurality of vanes connected between said body portion and the inner wall of said tube for removing the swirl from said flow stream, said one and said other non-revolvable means cooperating to establish a strong vortex field therebetween.

References Cited

UNITED STATES PATENTS

| 887,893 | 5/1908 | Wickstrum | 55—396 |
| 895,729 | 8/1908 | Cottrell | 55—151 X |
| 2,594,805 | 4/1952 | Rommel | 55—127 |
| 2,667,942 | 2/1954 | Wintermute | 55—127 |
| 3,258,895 | 7/1966 | Weibe et al. | 55—416 X |

FOREIGN PATENTS

| 858,837 | 12/1952 | Germany. |
| 11,625 | 1907 | Great Britain. |
| 698,874 | 10/1953 | Great Britain. |
| 711,304 | 6/1954 | Great Britain. |
| 729,612 | 5/1955 | Great Britain. |
| 18,369 | 11/1958 | Norway. |

FRANK W. LUTTER, Primary Examiner

D. E. TALBERT, JR., Assistant Examiner

U.S. Cl. X.R.

55—138, 146, 152, 396, 416, 450, 457; 204—323; 210—243, 512